United States Patent
He et al.

(10) Patent No.: US 11,974,153 B2
(45) Date of Patent: Apr. 30, 2024

(54) MEASUREMENT GAP MANAGEMENT FOR SSB AND CSI-RS BASED RRM MEASUREMENT

(71) Applicant: Nokia Technologies Oy, Espoo (FI)

(72) Inventors: Jing He, Beijing (CN); Lars Dalsgaard, Oulu (FI); Li Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 521 days.

(21) Appl. No.: 17/266,903

(22) PCT Filed: Aug. 17, 2018

(86) PCT No.: PCT/CN2018/101060
§ 371 (c)(1),
(2) Date: Feb. 8, 2021

(87) PCT Pub. No.: WO2020/034193
PCT Pub. Date: Feb. 20, 2020

(65) Prior Publication Data
US 2021/0345146 A1    Nov. 4, 2021

(51) Int. Cl.
*H04W 24/10* (2009.01)
*H04B 7/06* (2006.01)
*H04L 5/00* (2006.01)
*H04W 56/00* (2009.01)

(52) U.S. Cl.
CPC .......... *H04W 24/10* (2013.01); *H04B 7/0626* (2013.01); *H04L 5/0051* (2013.01); *H04W 56/001* (2013.01)

(58) Field of Classification Search
CPC .............. H04W 24/10; H04W 56/001; H04W 36/0094; H04B 7/0626; H04B 17/309; H04L 5/0051; H04L 5/0091; H04L 5/005
See application file for complete search history.

(56) References Cited

U.S. PATENT DOCUMENTS

| | | |
|---|---|---|
| 9,026,158 B1 | 5/2015 | Choi et al. |
| 2005/0286468 A1 | 12/2005 | Agin et al. |
| 2019/0173634 A1* | 6/2019 | Teyeb ............... H04W 36/0088 |
| 2021/0120513 A1* | 4/2021 | Siomina ............... H04W 64/00 |

OTHER PUBLICATIONS

Office action received for corresponding Korean Patent Application No. 2021-7007787, dated Aug. 27, 2022, 7 pages of office action and 4 pages of translation available.

(Continued)

*Primary Examiner* — Chuong A Ngo
(74) *Attorney, Agent, or Firm* — Barta Jones, PLLC

(57) ABSTRACT

A method includes: receiving, at a user equipment, a first information of a first gap for a first reference signal to be measured and a second information of a second gap for a second reference signal to be measured, wherein the first gap and the second gap overlap at least partially; and, determining at least one of: a first duration of a gap length based on a union of the first gap and the second gap, and a second duration of a gap length based on a selection of the first gap or the second gap corresponding to one of the first reference signal and the second reference signal.

20 Claims, 5 Drawing Sheets

(56) References Cited

OTHER PUBLICATIONS

International Search Report and Written Opinion received for corresponding Patent Cooperation Treaty Application No. PCT/CN2018/101060, dated May 5, 2019, 10 pages.

"Discussion on Gap Configuration for CSI-RS Measurement", 3GPP TSG-RAN WG2 Meeting #103, R2-1812753, Agenda : 10.4.1.4.2, Nokia, Aug. 20-24, 2018, 3 pages.

Extended European Search Report received for corresponding European Patent Application No. 18930399.3, dated Apr. 12, 2022, 10 pages.

"Measurement Gap for CSI-RS", 3GPP TSG-RAN WG4 Meeting #84, R4-1707873, Agenda item: 9.6.4, MediaTek Inc., Aug. 21-25, 2017, 10 pages.

"MN and SN measurement gap coordination for CSI-RS", 3GPP TSG RAN WG2 Meeting #101bis, R2-1805035, Agenda item: 10.4.1.4.2, Intel Corporation, Apr. 16-20, 2018, pp. 1-4.

"Discussion on remaining issues for SSB based RLM requirements", 3GPP TSG-RAN WG4 Meeting #AH-1807, R4-1809052, Agenda item: 5.2.8, Huawei, Jul. 2-6, 2018, 3 pages.

\* cited by examiner

```
MeasObjectNR ::=                     SEQUENCE {
    ssbFrequency                         ARFCN-ValueNR
    OPTIONAL,      -- Cond SSBorAssociatedSSB
    ssbSubcarrierSpacing                 SubcarrierSpacing
    OPTIONAL,      -- Cond SSBorAssociatedSSB
    smtc1                                SSB-MTC
    OPTIONAL,      -- Cond SSBorAssociatedSSB
    smtc2                                SSB-MTC2
    OPTIONAL,      -- Cond IntraFreqConnected refFreqCSI-RS                        ARFCN-ValueNR
    OPTIONAL,
    referenceSignalConfig                ReferenceSignalConfig,
    ...
}
```

FIG. 2

```
SSB-MTC ::=                          SEQUENCE {
    periodicityAndOffset                 CHOICE {
        sf5                                  INTEGER (0..4),
        sf10                                 INTEGER (0..9),
        sf20                                 INTEGER (0..19),
        sf40                                 INTEGER (0..39),
        sf80                                 INTEGER (0..79),
        sf160                                INTEGER (0..159)
    },
    duration                             ENUMERATED { sf1, sf2, sf3, sf4, sf5 }
}
```

FIG. 3

```
CSI-RS-Resource-Mobility ::=    SEQUENCE {
    csi-RS-Index                CSI-RS-Index,
    slotConfig                  CHOICE {
        ms4                         INTEGER (0..31),
        ms5                         INTEGER (0..39),
        ms10                        INTEGER (0..79),
        ms20                        INTEGER (0..159),
        ms40                        INTEGER (0..319)
    },
    associatedSSB               SEQUENCE {
        ssb-Index                   SSB-Index,
        isQuasiColocated            BOOLEAN
    }
    OPTIONAL, -- Need R
    frequencyDomainAllocation   CHOICE {
        row1                        BIT STRING (SIZE (4)),
        row2                        BIT STRING (SIZE (12))
    },
    firstOFDMSymbolInTimeDomain INTEGER (0..13),
    sequenceGenerationConfig    INTEGER (0..1023),
    ...
}
```

FIG. 4

```
GapConfig ::=       SEQUENCE {
    gapOffset           INTEGER (0..159),
    mgl                 ENUMERATED {ms1dot5, ms3, ms3dot5, ms4, ms5dot5, ms6},
    mgrp                ENUMERATED {ms20, ms40, ms80, ms160},
    mgta                ENUMERATED {ms0, ms0dot25, ms0dot5},
    ...
}
```

FIG. 5

MEASUREMENT GAP MANAGEMENT FOR SSB AND CSI-RS BASED RRM MEASUREMENT

RELATED APPLICATION

This application claims priority to PCT Application No. PCT/CN2018/101060, filed on Aug. 17, 2018 which is incorporated herein by reference in its entirety.

BACKGROUND

Technical Field

The exemplary and non-limiting embodiments described herein relate generally to radio standards (protocols relating to the physical layer, medium access control, radio link control, and/or radio resource control of any radio that are standard related) and, more particularly, to the management of gap measurement in radio networks.

Brief Description of Prior Developments

In a radio network, RRM is the system level management of various resources in wireless communication systems such as cellular networks and wireless local area networks. RRM involves strategies and algorithms for controlling parameters such as channel allocation, signal synchronization, beam management, power transmission, handover protocols, and the like. Particularly with regard to allocating channels and synchronizing signals, the duration of gaps in signals is generally managed to maintain the transmission of data within acceptable limits of interruption.

One manner of managing the measurement of gaps for SSB and CSI-RS based measurement is to use a single gap configuration for both measurements. This is simple, but it imposes a restriction that a network should ensure that the SSB and CSI-RS can always be covered by a single gap duration. Also, it means the same gap duration (which in turn means the interruption of data) is used even if the durations of the two RS are different (SMTC window can be up to 5 milliseconds (ms), while CSI-RS is typically 1 symbol).

It can be assumed that the network can configure separate gaps for SSB based measurement and CSI-RS based measurement, each with its own duration, period, and offset. However, when two gaps overlap in time, uncertainty may exist as to which measurement is applied and which measurement receives the interruption of data.

SUMMARY

The following summary is merely intended to be exemplary. The summary is not intended to limit the scope of the claims.

In accordance with one aspect, a method comprises: receiving, at a user equipment, a first information of a first gap for a first reference signal to be measured and a second information of a second gap for a second reference signal to be measured, wherein the first gap and the second gap overlap at least partially; determining at least one of: a first duration of a gap length based on a union of the first gap and the second gap, and a second duration of a gap length based on a selection of the first gap or the second gap corresponding to one of the first reference signal and the second reference signal. And, the method may further comprise measuring at least one of the first reference signal or the second reference signal based on the at least one of the determined first duration of the gap length or the determined second duration of the gap length.

In accordance with another aspect, an apparatus comprises: at least one processor; and at least one memory including computer program code, the at least one memory and the computer program code configured to, with the at least one processor, cause the apparatus at least to: receive a first information of a first gap for a first reference signal to be measured and a second information of a second gap for a second reference signal to be measured, wherein the first gap and the second gap overlap at least partially; determine at least one of: a first duration of a gap length based on a union of the first gap and the second gap, and a second duration of a gap length based on a selection of the first gap or the second gap corresponding to one of the first reference signal and the second reference signal. The at least one memory and the computer program code configured to, with the at least one processor, cause the apparatus at least to measure at least one of the first reference signal or the second reference signal based on the at least one of the determined first duration of the gap length or the determined second duration of the gap length.

In accordance with another aspect, a method comprises: configuring, at a network node, a first gap for a first reference signal to be measured and a second gap for a second reference signal to be measured, wherein the first gap and the second gap overlap at least partially; receiving a measurement result of at least one of the first reference signal or the second reference signal, wherein the measurement result is based on measurement made based on at least one of: a first duration of a gap length based on a union of the first gap and the second gap, and a second duration of a gap length based on a selection of the first gap or the second gap corresponding to one of the first reference signal and the second reference signal.

BRIEF DESCRIPTION OF THE DRAWINGS

The foregoing aspects and other features are explained in the following description, taken in connection with the accompanying drawings, wherein:

FIG. 2 is a graphic illustration of various optional measurement objects in an RRM measurement in NR based on SSB or CSI-RS;

FIG. 3 is a graphic illustration of an SSB based RRM measurement showing various measurement objects;

FIG. 4 is a graphic illustration of a CSI-RS based RRM measurement showing various measurement objects;

FIG. 5 is a graphic illustration of an RRM measurement based on measurement gaps, showing various measurement objects;

DETAILED DESCRIPTION OF EMBODIMENT

Figure 1:
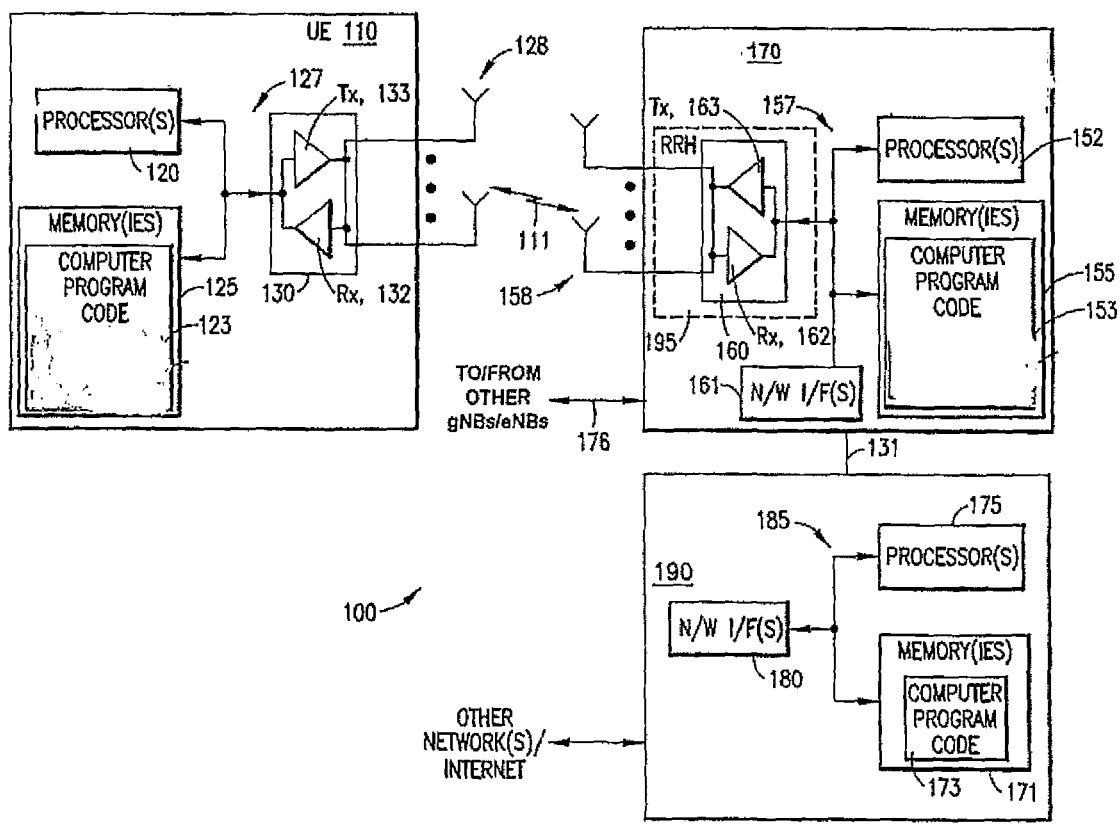
FIG. 1 is a schematic diagram illustrating some devices of a network.

The following abbreviations that may be found in the specification and/or the drawing figures are defined as follows:

CSI-RS Channel State Information Reference Signal

FDM Frequency Division Multiplex

MGRP Measurement Gap Repetition Period
NR New Radio
RRM Radio Resource Management
SFN System Frame Number
SMTC SSB Measurement Timing Configuration
SSB Synchronization Signal and PBCH (Physical Broadcast Channel) Block The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for the management of measurement gaps when a network is configured for both SSB based measurement and CSI-RS based measurement. The network may be a 5G network or at least any network that utilizes NR software. What is proposed herein is a solution on how the network manages the measurement gaps for SSB based measurement and CSI-RS based measurement, and corresponding UE behavior.

Referring to FIG. 1, one exemplary configuration of various components for some devices of a network are shown generally at 100. In FIG. 1, the user equipment (UE) 110 is in wireless communication with the wireless network 100. The UE is a wireless, typically mobile, device that can access the wireless network. The UE 110 includes one or more processors 120, one or more memories 125, and one or more transceivers 130 interconnected through one or more buses 127. Each of the one or more transceivers 130 includes a receiver (Rx) 132 and a transmitter (Tx) 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The one or more memories 125 and the computer program code 123 may be configured to, with the one or more processors 120, cause the UE 110 to perform one or more of the operations as described herein. The UE 110 communicates with the apparatus 170 via a wireless link 111. The apparatus 170 may be any one of the IAB donor 20 or the IAB nodes 12, for example. In this example, the apparatus 170 has features or components of a gNB. A wireless attached IAB node, a Donor IAB node, and a conventional gNB may be implemented on identical hardware or may include different hardware, but some of the core components such as processor(s), memory(ies), receiver(s), and transmitter(s) are present in each. FIG. 1 is merely intended to show a simplified version of some of the components of a IAB node, a Donor IAB node, and a conventional gNB, but it is understood that there is a differentiation between a wireless IAB node and a Donor IAB node/gNB.

The apparatus 170 (hereinafter gNB 170) is a base station (for example, for 5G, although LTE and 4G are also within the scope of the exemplary embodiments disclosed herein) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver (Rx) 162 and a transmitter (Tx) 163. The one or more transceivers 160 are connected to one or more antennas 158. The one or more memories 155 include computer program code 153. The one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, for example, link 176. The link 176 may be wired or wireless or both and may implement, for example, an X2 or Xn interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB. For instance, there could be three cells for a single gNB carrier frequency and associated bandwidth, each cell covering one-third of a 360 degree area so that the single gNB's coverage area covers an approximate oval or circle. Furthermore, each cell can correspond to a single carrier and a gNB may use multiple carriers. So if there are three 120 degree cells per carrier and two carriers, then the gNB has a total of 6 cells.

The wireless network 100 may include one or more network elements 190. For example, with a EPC the network elements 190 may include MME (Mobility Management Entity) and/or SGW (Serving Gateway) functionality. As another example, with a 5G core network (5GCN) the network elements may include Access and Mobility Function (AMF), MME (Mobility Management Entity) and/or SGW (Serving Gateway) functionality. Connectivity with a further network may be provided, such as a telephone network and/or a data communications network (for example, the Internet). The gNB/eNB 170 is coupled via a link 131 to the network element 190. The link 131 may be implemented as, for example, an S1 or NG interface. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

Those skilled in the art will appreciate that the various network elements shown in FIG. 1 may be implemented differently in future wireless networks, and are not limited to 4G, LTE, or 5G wireless networks. For example, the terms NCE, MME, and SGW are terms generally used for the core elements in a LTE network. In contrast to LTE, future wireless networks may carry out network functions (NFs) by a plurality of cooperating devices. The different NFs, may include for example, Access and Mobility Function (AMF), Session Management Function (SMF), Policy Control Function (PCF), Application Function (AF), Authentication Server Function (AUSF), User Plane Function (UPF), and User Data Management (UDM). These NFs may be a virtualized function instantiated on an appropriate platform, such as a cloud infrastructure. For example, certain protocols (such as non real-time protocols for example) may be performed by one or more centralized units (CUs) in a cloud infrastructure, while one or more distributed units (DUs) operate the remaining protocols (e.g., real-time protocols) of the 5G radio interface. In this way, the various NFs may be split between CUs and DUs. Together a CU, underlying DUs, and RRHs may be considered as forming a logical base station (which may be represented by gNB 170 in FIG. 1 for example).

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs), and processors based on a multi-core processor architecture, as non-limiting examples. The processors 120, 152, and 175 may be means for performing functions, such as controlling the UE 110, eNB/gNB 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

A Central Unit (CU) is a logical node which may include the functions (i.e., gNB functions) such as Transfer of user data, Mobility control, Radio access network sharing, Positioning, Session Management etc., except those functions allocated exclusively to the DU. A CU may control the operation of DUs over a front-haul (F1) interface. A central unit (CU) may also be known as BBU/REC/RCC/C-RAN/V-RAN. A Distributed Unit (DU) is a logical node which may include a subset of the functions (i.e., gNB functions), depending on the functional split option. The operation of the DU may be controlled by the CU. A Distributed Unit (DU) may also be known with other names like RRH/RRU/RE/RU.

Referring now to FIG. 2, radio resource control protocols employed in radio networks such as the network 100 generally employ measurement objects, as shown at 200. As shown in FIG. 2, RRM measurement in NR can be based on SSB or CSI-RS. One exemplary measurement object can be configured as either SSB based or CSI-RS based. In an SSB based measurement, information elements such as carrier spacing may be objects to be measured. In a CSI-RS based measurement, ReferenceSignalConfig may be the object.

Referring to FIG. 3, SSB based RRM measurement may be performed in the SMTC window, the duration, period and offset of which are included in SSB-MTC, as shown at 300. In FIG. 3, parameters such as periodicity may be measured and assigned values.

Referring to FIG. 4, CSI-RS based RRM measurement may be performed on CSI-RS symbols, the time domain location of which are included in CSI-RS-Resource-Mobility, as shown at 400, which is further included in ReferenceSignalConfig.

As can be seen in both FIGS. 3 and 4, the time domain location of the SMTC window and the CSI-RS symbols are configured separately, so it is possible that the network configures them in the overlapping symbols, in different but adjacent symbols, or in different and distanced symbols.

Referring to FIG. 5, RRM measurement may be based on measurement gaps. The duration, period, and offset of the gap may be configured by the network (GapConfig, as indicated at 500). For a gap based measurement like inter-frequency measurement, the network should ensure that the RS to be measured are covered in gap duration, as otherwise the UE 110 cannot perform the measurement.

In order to address the problem of how the network should approach the measurement gaps when the network is configured for both SSB based measurement and CSI-RS based measurement (both of which are gap-based), one exemplary embodiment of a solution involves managing the gaps in relation to the corresponding UE behavior. In managing the measurement gaps by the network (e.g., network 100), two kinds of measurement gap are configured to the UE 110, and the period, duration, and offset of each may be the same or different depending on the configuration of the respective RS. The two kinds of measurement gaps are (1) a gap for SSB measurement (Gap-SSB) and (2) a gap for CSI-RS measurement (Gap-CSI-RS).

Figure 6:
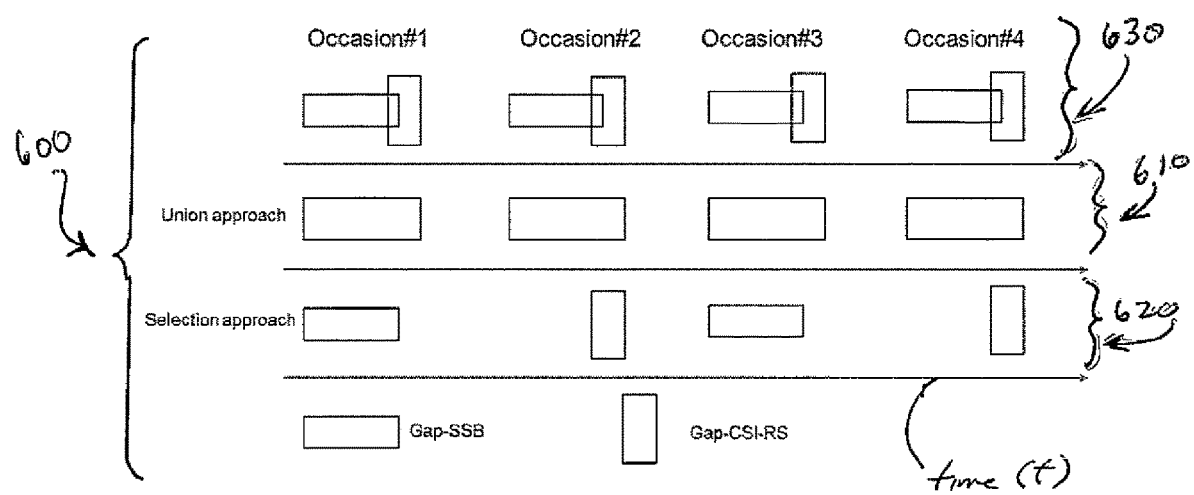
FIG. 6 is a graphic illustration of alternative approaches to the management of gaps for SSB and CSI-RS based RRM measurements.

Referring now to FIG. 6, a schematic illustrating two alternatives for gap measurement is shown generally at 600. If the Gap-SSB and the Gap-CSI-RS overlap in time t either fully or partially, either a union approach 610 or a selection approach 620 may be carried out for any one of four different occasions 630. As for using the union approach 610 or the selection approach 620, it can be decided by the network 100 who is responsible for measurement gap configuration to the UE 110 and the network node indicating the decision to the UE 110, or it can be decided by the UE 110 and the UE 110 shall report the decision to network 100.

In the union approach 610, the gap in all overlapping occasions 630 will be for both SSB and CSI-RS (Gap-SSB-CSI-RS), and a duration of the measurement gap length will be the union of the two gap durations, which is equal to the sum of the measurement gap lengths less the difference in lengths due to overlap:

(measurement gap length 1)+(measurement gap length 2)−(measurement gap length overlap time)

where the UE 110 measures both SSB measurement and CSI-RS measurement if this is supported by the UE 110. If the UE 110 does not simultaneously support SSB and CSI-RS measurements, the UE 110 measures either SSB or CSI-RS in the combined gap, for example, according to a network indicated share ratio or a default share ratio (for example, 1:1).

In the selection approach 620, in each overlapping occasion 630 the gap will be used either for SSB-based measurements (Gap-SSB) or CSI-RS-based measurements (Gap-CSI-RS). The gap type is determined from the SFN of the overlapping occasion as $$\text{mod}(\text{floor}(SFN/MGRP),N)=0,M$$

$$\text{mod}(\text{floor}(SFN/MGRP),N)=M+1,\ldots,N-1$$

where MGRP is the periodicity of the overlapping occasions and M and N are integer numbers which denote the share ratio between SSB measurement and CSI-RS measurement as M:(N−M) indicated by network. In the selection approach 620, the duration of the interruption time is either the duration of Gap-SSB or duration of Gap-CSI-RS, depending on the determined gap type, and the UE 110 measures either SSB or CSI-RS according to the determined gap type.

Although FIG. 6 illustrates partial overlapping between Gap-SSB and Gap-CSI-RS, the same idea can be used for complete overlapping, for example, where one of the Gap-SSB and the Gap-CSI-RS is within the start and end times of the other of the Gap-CSI-RS and the Gap-SSB.

In addition, the idea of the selection approach 620 can be applied for non-gap based SSB and CSI-RS measurement. In instances in which the SSB and the CSI-RS are FDM-ed and the UE 110 does not or is not able to simultaneously measure the two reference signals, the reference signal to be measured may be determined in the same manner as determining the gap type, with the corresponding interruption to the data due to non-gap based measurement being determined from the reference signal to be measured.

Figure 7:
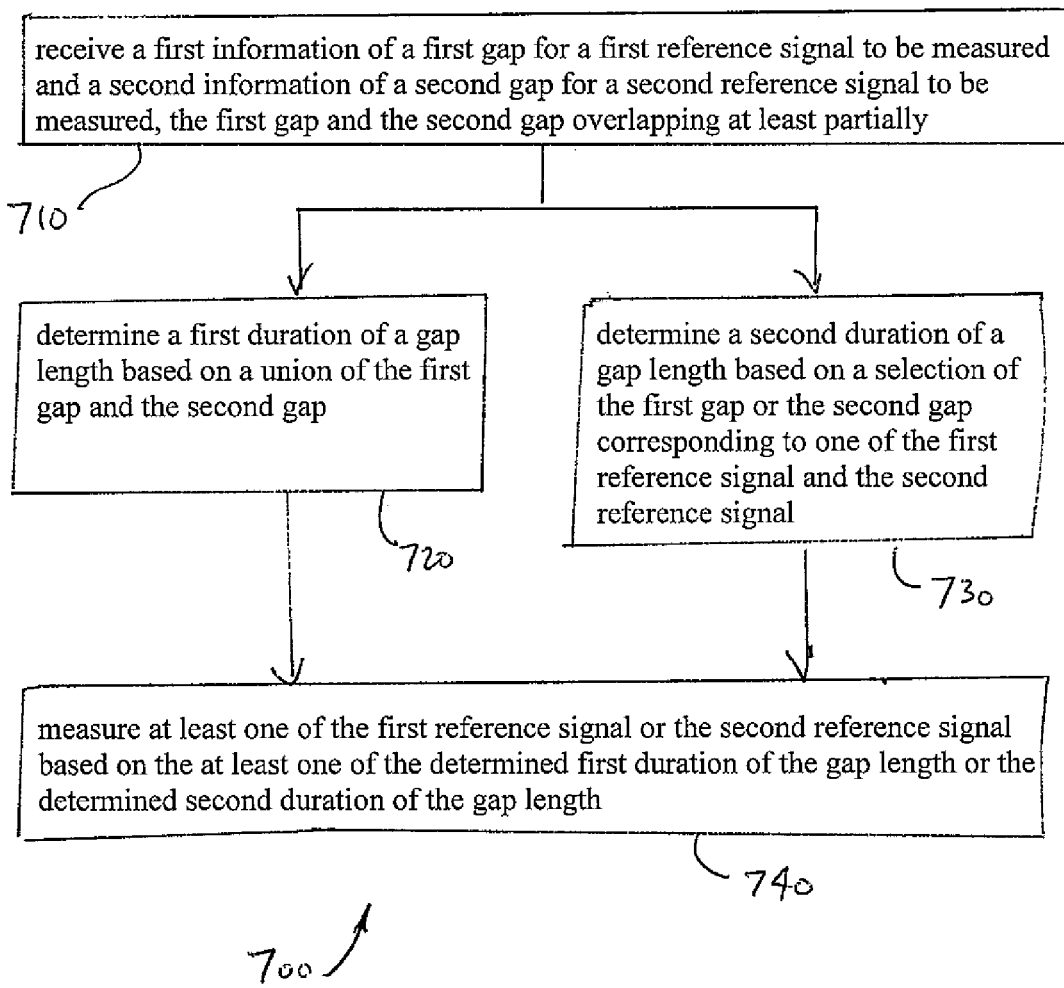
FIG. 7 is a flow of a process of determining an interrupt time based on the management of gaps for SSB and CSI-RS based RRM measurements.

Referring to FIG. 7, a flow of a method of measuring the first reference signal and/or the second reference signal based on the determined first duration of the gap length and/or the determined second duration of the gap length is shown generally at 700. In block 710, information of a first gap for a first reference signal and information of a second gap for a second reference signal are received at the UE 110, wherein the first gap and the second gap overlap at least partially. In block 720, a first duration of a gap length based on a union of the first gap and the second gap may be determined. The union, also known as union approach, as well as the first duration may be determined at the UE or at the gNB. If the gNB makes the determination, it will transmit relevant information of the determination to inform the UE. In block 730, a second duration of a gap length based on a selection of the first gap or the second gap may be determined. The selection, also known as selection approach, as well as the second duration may be determined at the UE or at the gNB. If the gNB makes the determination, it will transmit relevant information of the determination to inform the UE. The UE 110 may decide whether to proceed by block 720 or block 730. As indicated in block 740, a measurement of at least one of the reference signals based on the at least one of the determined first determination of the gap length or the determined second duration of the gap length is made.

Based on the foregoing, the proposed solution allows the network to manage two measurement gaps for SSB and CSI-RS measurements, which gives the network the flexibility in terms of relative timing between SSB and CSI-RS. Furthermore, the union approach 610 may simplify the UE complexity although at the cost of data opportunity, whereas the selection approach 620 may optimize the data opportunity. By determining the measurement gap type, the interruption for data is limited to the minimum needed.

In one example embodiment, a method comprises: receiving, at a user equipment, a first information of a first gap for a first reference signal to be measured and a second information of a second gap for a second reference signal to be measured, wherein the first gap and the second gap overlap at least partially; determining at least one of: a first duration of a gap length based on a union of the first gap and the second gap, and a second duration of a gap length based on a selection of the first gap or the second gap corresponding to one of the first reference signal and the second reference signal. The method may further comprise measuring at least one of the first reference signal or the second reference signal based on the at least one of the determined first duration of the gap length or the determined second duration of the gap length.

The method may further comprise determining a duration of an interruption time in received downlink data and transmitted uplink data based on at least one of the determined first duration of the gap length and the determined second duration of the gap length. The method may further comprise determining the duration of the interruption time based on either the determined first duration of the gap length or the determined second duration of the gap length depending upon a type of a gap. The method may further comprise determining the duration of the interruption time based on non-gap measurement determined from at least one of the first reference signal and the second reference signal. The determined first duration of the gap length based on the union of the first gap and the second gap may comprise a summation of a length of the first gap and a length of the second gap minus an overlap time between the length of the first gap and the length of the second gap. The method may further comprise measuring the first reference signal and the second reference signal in the determined first duration of the gap length based on the union of the first gap and the second gap. The method may further comprise measuring the first reference signal and the second reference signal during the determined first duration of the gap length according to one of a network indicated share ratio and a default ratio. The reference signal to be measured and the second duration of the gap length may be determined based on a system frame number of the overlap of the first gap and the second gap. The reference signal to be measured and the second duration of the gap length may be determined based on: mod(floor(SFN/MGRP),N)=0, . . . , M, wherein MGRP is a periodicity of the overlap of the first gap and the second gap, and M and N are integer numbers that share a ratio between a measurement of the first reference signal and the second reference signal; and wherein if a system frame number of the overlap of the first gap and the second gap satisfies this condition, the first reference signal is measured and the second duration of the gap length or the gap duration is determined to be the duration of the first gap or the configured first gap's duration. In this case the second duration of the gap length or the gap duration may be equivalent to the duration of the first gap or the configured first gap's duration. The reference signal to be measured and the second duration of the gap length may be determined based on: mod(floor(SFN/MGRP),N)=M+1, . . . , N−1, wherein MGRP is a periodicity of the overlap of the first gap and the second gap, and M and N are integer numbers that share a ratio between a measurement of the first reference signal and the second reference signal; and wherein if a system frame number of the overlap of the first gap and the second gap satisfies this condition, the second reference signal is measured and the second duration of the gap length or the gap duration is determined to be the duration of the second gap or the configured second gap's duration. In this case the second duration of the gap length or the gap duration may be equivalent to the duration of the second gap or the configured second gap's duration. The overlap of the first gap and the second gap may comprise a complete overlap. The first reference signal may comprise a synchronization signal and physical broadcast channel block. The second reference signal may comprise a channel state information reference signal. Exemplary aspects may also include a non-transitory computer readable medium encoded with instructions that, when executed by a computer, cause performance of a method as described herein.

In another example embodiment, an apparatus comprises: at least one processor; and at least one memory including computer program code, the at least one memory and the computer program code configured to, with the at least one processor, cause the apparatus at least to: receive a first information of a first gap for a first reference signal to be measured and a second information of a second gap for a second reference signal to be measured, wherein the first gap and the second gap overlap at least partially; determine at least one of: a first duration of a gap length based on a union of the first gap and the second gap, and a second duration of a gap length based on a selection of the first gap or the second gap corresponding to one of the first reference signal and the second reference signal. The at least one memory and the computer program code configured to, with the at least one processor, cause the apparatus at least to measure at least one of the first reference signal or the second reference signal based on the at least one of the determined first duration of the gap length or the determined second duration of the gap length.

The at least one memory and the computer program code configured to, with the at least one processor, cause the apparatus at least to determine a duration of an interruption time in received downlink data and transmitted uplink data based on at least one of the determined first duration of the gap length and the determined second duration of the gap length. The at least one memory and the computer program code configured to, with the at least one processor, cause the apparatus at least to determine the duration of the interruption time based on either the determined first duration of the gap length or the determined second duration of the gap length depending upon a type of a gap. The at least one memory and the computer program code configured to, with the at least one processor, cause the apparatus at least to determine the duration of the interruption time based on non-gap measurement determined from at least one of the first reference signal and the second reference signal. The determined first duration of the gap length based on the union of the first gap and the second gap may comprise a summation of a length of the first gap and a length of the second gap minus an overlap time between the length of the first gap and the length of the second gap. The at least one memory and the computer program code configured to, with the at least one processor, cause the apparatus at least to measure the first reference signal and the second reference signal in the determined first duration of the gap length based on the union of the first gap and the second gap. The at least one memory and the computer program code configured to, with the at least one processor, cause the apparatus at least to measure the first reference signal and the second reference signal during the determined first duration of the gap length according to one of a network indicated share ratio and a default ratio. The at least one memory and the computer program code configured to, with the at least one processor, cause the apparatus at least to measure the reference signal and to determine the second duration of the gap length based on a system frame number of the overlap of the first gap and the second gap. The at least one memory and the computer program code configured to, with the at least one processor, cause the apparatus at least to measure the reference signal and to determine the second duration of the gap length based on: $\text{mod}(\text{floor}(\text{SFN}/\text{MGRP}),N) = 0, \ldots, M$, wherein MGRP is a periodicity of the overlap of the first gap and the second gap, and M and N are integer numbers that share a ratio between a measurement of the first reference signal and the second reference signal; and wherein if a system frame number of the overlap of the first gap and the second gap satisfies this condition, the first reference signal is measured and the second duration of the gap duration is determined to be the configured first gap's duration. The at least one memory and the computer program code configured to, with the at least one processor, cause the apparatus at least to measure the reference signal and to determine the second duration of the gap length based on: $\text{mod}(\text{floor}(\text{SFN}/\text{MGRP}),N) = M+1, \ldots, N-1$, wherein MGRP is a periodicity of the overlap of the first gap and the second gap, and M and N are integer numbers that share a ratio between a measurement of the first reference signal and the second reference signal; and wherein if a system frame number of the overlap of the first gap and the second gap satisfies this condition, the second reference signal is measured and the second duration of the gap duration is determined to be the configured second gap's duration. The first reference signal measured by the apparatus may comprise a synchronization signal and physical broadcast channel block. The second reference signal measured by the apparatus may comprise a channel state information reference signal. The apparatus may include other means for carrying out the foregoing actions.

In another example embodiment, a method comprises: configuring, at a network node, a first gap for a first reference signal to be measured and a second gap for a second reference signal to be measured, wherein the first gap and the second gap overlap at least partially; receiving a measurement result of at least one of the first reference signal or the second reference signal, wherein the measurement result is based on measurement made based on at least one of: a first duration of a gap length based on a union of the first gap and the second gap, and a second duration of a gap length based on a selection of the first gap or the second gap corresponding to one of the first reference signal and the second reference signal.

In another example embodiment, an apparatus comprises: means for receiving a first information of a first gap for a first reference signal to be measured and a second information of a second gap for a second reference signal to be measured, wherein the first gap and the second gap overlap at least partially; means for determining at least one of: a first duration of a gap length based on a union of the first gap and the second gap, and a second duration of a gap length based on a selection of the first gap or the second gap corresponding to one of the first reference signal and the second reference signal. The apparatus may further comprise means for measuring at least one of the first reference signal or the second reference signal based on the at least one of the determined first duration of the gap length or the determined second duration of the gap length.

The processors and memories as described herein are within the scope of computer readable mediums. A computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications, and variances which fall within the scope of the appended claims.

What is claimed is:

1. An apparatus, comprising:
   at least one processor; and
   at least one memory including computer program code, the at least one memory and the computer program code configured to, with the at least one processor, cause the apparatus at least to:
   receive a first information of a first gap for a first reference signal to be measured and a second information of a second gap for a second reference signal to be measured, wherein the first gap and the second gap overlap at least partially; and,
   determine at least one of:
      a first duration of a gap length based on a union of the first gap and the second gap, or
      a second duration of a gap length based on a selection of the first gap or the second gap corresponding to one of the first reference signal and the second reference signal.

2. The apparatus of claim 1, wherein the at least one memory and the computer program code configured to, with the at least one processor, cause the apparatus at least to determine a duration of an interruption time in received downlink data and transmitted uplink data based on at least one of the determined first duration of the gap length or the determined second duration of the gap length.

3. The apparatus of claim 2, wherein the at least one memory and the computer program code configured to, with the at least one processor, cause the apparatus at least to determine the duration of the interruption time based on either the determined first duration of the gap length or the determined second duration of the gap length depending upon a type of a gap.

4. The apparatus of claim 2, wherein the at least one memory and the computer program code configured to, with the at least one processor, cause the apparatus at least to determine the duration of the interruption time based on non-gap measurement determined from at least one of the first reference signal or the second reference signal.

5. The apparatus of claim 1, wherein the determined first duration of the gap length based on the union of the first gap and the second gap comprises a summation of a length of the first gap and a length of the second gap minus an overlap time between the length of the first gap and the length of the second gap.

6. The apparatus of claim 1, wherein the at least one memory and the computer program code configured to, with the at least one processor, cause the apparatus at least to measure the first reference signal and the second reference signal in the determined first duration of the gap length based on the union of the first gap and the second gap.

7. The apparatus of claim 1, wherein the at least one memory and the computer program code configured to, with the at least one processor, cause the apparatus at least to measure the first reference signal and the second reference signal during the determined first duration of the gap length according to one of a network indicated share ratio and a default ratio.

8. The apparatus of claim 1, wherein the at least one memory and the computer program code configured to, with the at least one processor, cause the apparatus at least to measure a reference signal and to determine the second duration of the gap length based on a system frame number of the overlap of the first gap and the second gap.

9. The apparatus of claim 1, wherein the at least one memory and the computer program code configured to, with the at least one processor, cause the apparatus at least to measure the reference signal and to determine the second duration of the gap length based on:

$$\mathrm{mod}(\mathrm{floor}(SFN/MGRP),N)=0,\ldots,M$$

wherein MGRP is a periodicity of the overlap of the first gap and the second gap, SFN is a system frame number, and M and N are integer numbers that share a ratio between a measurement of the first reference signal and the second reference signal; and
   wherein if a system frame number of the overlap of the first gap and the second gap satisfies this condition, the first reference signal is measured and the second duration of the gap length is determined to be duration of the first gap.

10. The apparatus of claim 1, wherein the at least one memory and the computer program code configured to, with the at least one processor, cause the apparatus at least to measure the reference signal and to determine the second duration of the gap length based on:

$$\mathrm{mod}(\mathrm{floor}(SFN/MGRP),N)=M+1,\ldots,N-1$$

wherein MGRP is a periodicity of the overlap of the first gap and the second gap, SFN is a system frame number, and M and N are integer numbers that share a ratio between a measurement of the first reference signal and the second reference signal; and
   wherein if a system frame number of the overlap of the first gap and the second gap satisfies this condition, the second reference signal is measured and the second duration of the gap length is determined to be duration of the second gap.

11. The apparatus of claim 1, wherein the first reference signal measured by the apparatus comprises a synchronization signal and physical broadcast channel block.

12. The apparatus of claim 1, wherein the second reference signal measured by the apparatus comprises a channel state information reference signal.

13. The apparatus of claim 1, wherein the at least one memory and the computer program code configured to, with the at least one processor, cause the apparatus at least to measure at least one of the first reference signal or the second reference signal based on the at least one of the determined first duration of the gap length or the determined second duration of the gap length.

14. A method, comprising:
receiving, at a user equipment, a first information of a first gap for a first reference signal to be measured and a second information of a second gap for a second reference signal to be measured, wherein the first gap and the second gap overlap at least partially; and,
determining at least one of:
a first duration of a gap length based on a union of the first gap and the second gap, or
a second duration of a gap length based on a selection of the first gap or the second gap corresponding to one of the first reference signal and the second reference signal.

15. The method of claim 14, further comprising determining a duration of an interruption time in received downlink data and transmitted uplink data based on at least one of the determined first duration of the gap length or the determined second duration of the gap length.

16. The method of claim 14, wherein the determined first duration of the gap length based on the union of the first gap and the second gap comprises a summation of a length of the first gap and a length of the second gap minus an overlap time between the length of the first gap and the length of the second gap.

17. The method of claim 14, further comprising measuring the first reference signal and the second reference signal in the determined first duration of the gap length based on the union of the first gap and the second gap.

18. The method of claim 14, further comprising measuring the first reference signal and the second reference signal during the determined first duration of the gap length according to one of a network indicated share ratio and a default ratio.

19. The method of claim 14, wherein a reference signal to be measured and the second duration of the gap length is determined based on a system frame number of the overlap of the first gap and the second gap.

20. An apparatus, comprising:
at least one processor; and
at least one memory including computer program code, the at least one memory and the computer program code configured to, with the at least one processor, cause the apparatus at least to:
configure a first gap for a first reference signal to be measured and a second gap for a second reference signal to be measured, wherein the first gap and the second gap overlap at least partially; and,
receive a measurement result of at least one of the first reference signal or the second reference signal, wherein the measurement result is based on measurement made based on at least one of:
a first duration of a gap length based on a union of the first gap and the second gap, or
a second duration of a gap length based on a selection of the first gap or the second gap corresponding to one of the first reference signal and the second reference signal.

* * * * *